US012591052B1

(12) United States Patent
Wolffbrandt et al.

(10) Patent No.:  US 12,591,052 B1
(45) **Date of Patent:  \*Mar. 31, 2026**

(54) TACTICAL MOTION SENSOR APPARATUS AND METHOD

(71) Applicant: Jeral Innovations LLC, Rio Rancho, NM (US)

(72) Inventors: Jeremy Wolffbrandt, Albuquerque, NM (US); Allen Ciesliga, Clawson, MI (US)

(73) Assignee: Jeral Innovations LLC, Rio Rancho, NM (US)

( \* ) Notice: Subject to any disclaimer, the term of this patent is extended or adjusted under 35 U.S.C. 154(b) by 328 days.

This patent is subject to a terminal disclaimer.

(21) Appl. No.: 18/238,343

(22) Filed: Aug. 25, 2023

Related U.S. Application Data

(63) Continuation of application No. 16/380,800, filed on Apr. 10, 2019, now Pat. No. 11,821,976.

(60) Provisional application No. 62/655,621, filed on Apr. 10, 2018.

(51) Int. Cl.
| | |
|---|---|
| *G01S 13/02* | (2006.01) |
| *G01P 13/00* | (2006.01) |
| *G01S 7/02* | (2006.01) |
| *G01S 13/88* | (2006.01) |

(52) U.S. Cl.
CPC .......... *G01S 13/0209* (2013.01); *G01P 13/00* (2013.01); *G01S 7/027* (2021.05); *G01S 13/888* (2013.01)

(58) Field of Classification Search
CPC .. G01S 2205/07; G01S 2205/08; G01S 5/017; G01S 13/888; G01S 15/66; H04W 4/026
See application file for complete search history.

(56) References Cited

U.S. PATENT DOCUMENTS

| | | | |
|---|---|---|---|
| 5,299,971 | A | 4/1994 | Hart |
| 7,946,051 | B1 | 5/2011 | Hannah et al. |
| 2007/0024488 | A1 | 2/2007 | Zemany et al. |
| 2007/0205937 | A1 | 9/2007 | Thompson et al. |
| 2008/0007445 | A1 | 1/2008 | Leach, Jr. et al. |

(Continued)

OTHER PUBLICATIONS

"Motion Sensor (FGBHMS-001) Manual", https://manuals.fibaro.com/hk-motion-sensor/ (downloaded Aug. 19, 2019).

(Continued)

*Primary Examiner* — Timothy X Pham
(74) *Attorney, Agent, or Firm* — Peacock Law P.C.; Justin R. Jackson; Daniel Berenger-Russell

(57) ABSTRACT

A module attachable to a wall to sense motion of a subject on the other side of the wall and to visually indicate the motion to operators on the module's side of the wall, sized for use in tactical operations. Embodiments of the module comprise at least one through-the-wall motion sensor and an indicator, which can include a light source, visible from the outside of the module to indicate the motion of a subject detected by the sensor. Embodiments of the module can optionally include various features, including an enclosure for containing all the components in a single module, electromagnetic shielding material to direct sensing capabilities of the sensors, adhesive for quickly removably securing the module to a wall in tactical operations, additional types of sensors, a microcontroller for controlling various variables in the sensors and light source.

20 Claims, 11 Drawing Sheets

(56)                    References Cited

U.S. PATENT DOCUMENTS

| | | |
|---|---|---|
| 2008/0291076 A1 | 11/2008 | Skultety-Betz et al. |
| 2009/0262006 A1 | 10/2009 | Mcneill et al. |
| 2009/0303100 A1 | 12/2009 | Zemany |
| 2011/0025492 A1 | 2/2011 | Bravo |
| 2011/0025546 A1 | 2/2011 | Cook et al. |
| 2011/0148686 A1 | 6/2011 | Cole et al. |
| 2012/0119935 A1 | 5/2012 | Mohamadi et al. |
| 2014/0191862 A1 | 7/2014 | Haines |
| 2014/0269384 A1 | 9/2014 | Distasio |
| 2017/0161574 A1 | 6/2017 | Ick |
| 2017/0269203 A1 | 9/2017 | Trishaun |

OTHER PUBLICATIONS

"Through-the-Wall Sensors for Law Enforcement: Best Practices, Version 1.0", U.S. Department of Justice, https://nij.ojp.gov/library/publications/through-wall-sensors-law-enforcement-best-practices-version-10 (downloaded Aug. 19, 2019), Mar. 2014.

"Through-the-Wall Sensors for Law Enforcement: Market Survey", U.S. Department of Justice, https://nij.ojp.gov/library/publications/through-wall-sensors-law-enforcement-market-survey (downloaded Aug. 19, 2019), Oct. 2012.

"Through-The-Wall Surveillance", U.S. Department of Justice, Office of Justice Programs, National Institute of Justice, https://nij.ojp.gov/topics/articles/overview-through-wall-surveillance-technologies (downloaded Dec. 6, 2019), Jan. 14, 2013.

Akela , "Through the Wall Standoff Detection and Tracking of Individuals", U.S. Department of Justice, https://nij.ojp.gov/library/publications/through-wall-standoff-detection-and-tracking-individuals (downloaded Aug. 19, 2019), Apr. 30, 2012.

Applied Research Associates, Inc , "E-UGS Unatttended Ground Sensors", https://www.securityinfowatch.com/alarms-monitoring/alarm-systems-intrusion-detection/product/10910037/applied-research-associates-inc-eugs-unattended-ground-sensors [Downloaded Aug. 19, 2019], Mar. 26, 2013.

Ericson, Lars , et al., "Through-the-Wall Sensors (TTWS) for Law Enforcement: Use Case Scenarios (Version 1.3)", DOJ Office of Justice Programs, https://nij.ojp.gov/library/publications/through-wall-sensors-ttws-law-enforcement-use-case-scenarios-version-13 (downloaded Aug. 19, 2019), Apr. 24, 2014.

Huffman, Chad , et al., "Through-the-Wall Sensors (TTWS) for Law Enforcement: Test & Evaluation (Version 1.2)", DOJ Office of Justice Programs, https://nij.ojp.gov/library/publications/through-wall-sensors-ttws-law-enforcement-test-evaluation-version-12 (downloaded Aug. 19, 2019), Mar. 18, 2014.

Miles, Christopher A., "Through-the-Wall Surveillance: A New Technology for Saving Lives", U.S. Department of Justice, https://nij.ojp.gov/topics/articles/through-wall-surveillance-new-technology-saving-lives (downloaded Aug. 19, 2019), Oct. 1, 2007.

Vergados, Dimitrios D., et al., "Security Protocols in Wireless Tactical Sensor Networks", MILCOM 2005: 2005 IEEE Military Communications Conference, Oct. 17-20, 2005, Atlantic City, NJ, vol. 3, IEEE Communications Society, Mar. 20, 2006, 1463-1469.

TACTICAL MOTION SENSOR APPARATUS AND METHOD

CROSS-REFERENCE TO RELATED APPLICATIONS

This application is a continuation of U.S. patent application Ser. No. 16/380,800, entitled "Tactical Motion Sensor Apparatus and Method", filed on Apr. 10, 2019, which itself claims priority to and the benefit of U.S. Provisional Patent Application No. 62/655,621, entitled "Tactical Motion Sensor Apparatus and Method", filed on Apr. 10, 2018, and the specifications and claims, if any, thereof are incorporated herein by reference.

BACKGROUND OF THE INVENTION

Field of the Invention (Technical Field)

Embodiments of the present invention relate to motion sensor devices and methods, more particularly to detection of movement through a wall or other structure or barrier.

DESCRIPTION OF RELATED ART

In a tactical operation, the dangers posed by a suspect or other dangerous person on the other side of a wall or obstruction can be lessened if the location and direction of movement of that person can be known. Available devices for determining location and direction of motion through obstructions require their operator to use both hands to hold the device, which makes the operator defenseless and commits that user to only one function, namely, that of using the device; or require the operator to communicate the information (for example over radio or orally), which delays the communication and distracts other operator team members; or require the operator to stand next to the sensor to view the display, which puts the operator at risk of being close to areas of danger and potential explosives; or indicates the motion through complex wired or wireless networking, which delays the communication, adds unnecessary complication and expense, and increases the amount of time to get the sensors fully deployed.

Known motion sensor devices that can see through walls or other structures or obstructions require an operator's direct attention or manipulation. This distraction of attention is impractical for snipers or other tactical operators that must continually look through a scope at the scene and cannot easily or safely remove their eye from the scope to look at a motion sensor monitor or display, or to attend to radio communication. After being on scene for a number of hours, there is a tendency for tactical officers to lose focus on their view of a door or window, and if the indicator on the motion sensing device is only viewable by its one operator (or a limited number of the tactical operators), the delay in that operator's attention creates a dangerous situation for the other tactical officers. This is because any inattention by the one operator delays the communication to all and may present a safety risk.

Many motion sensor devices that are currently available are impractical for many other reasons, for example they are too large, not easily transportable, carriable, or deployable, making them useless in rapidly evolving tactical situations where rapid deployment is essential. Furthermore, known devices for detecting motion through obstructions are expensive, thus making their use impractical for some law enforcement agencies or in certain tactical operations.

What is needed is a through-the-wall motion sensor that indicates the motion on the other side of the wall or structure without the need for any network communication devices such as a radio or wireless system and that does not require the use of a display; that is small enough to be carried by one person; that can be quickly and securely attached to the wall or structure after which the operator can retreat to a safe distance; and that simultaneously indicates the motion to any number of operators at that safe distance while the operators simultaneously maintain positive visual contact with the wall or structure itself.

BRIEF SUMMARY OF THE INVENTION

Embodiments of the present invention relate to a motion sensor apparatus having an enclosure, a through-the-wall motion sensor disposed within the enclosure, an indicator coupled to the enclosure and configured to indicate motion detected by the through-the-wall motion sensor, and the motion sensor apparatus not comprising a wired or wireless network connection. The enclosure at least partially surrounds the through-the-wall motion sensor and the enclosure comprises a top and a bottom. In the apparatus, the through-the-wall motion sensor is preferably directed out of the bottom of the enclosure and the indicator is preferably coupled to or directed out through the top of the enclosure. Optionally, electromagnetic shielding material can be disposed on or in the top of the enclosure and adhesive can optionally be disposed on the bottom of the enclosure.

In one embodiment, the through-the-wall motion sensor can include a continuous wave radar sensor, and/or an ultra-wide band radar sensor. The through-the-wall motion sensor can be configured to distinguish between motion of a subject moving toward the through-the-wall motion sensor and motion of the subject moving away from the through-the-wall motion sensor. The through-the-wall motion sensor is preferably configured to sense a distance of a subject from the through-the-wall motion sensor. The motion sensor apparatus can include a passive infrared motion sensor directed through or from the top of the enclosure. And, the motion sensor apparatus can include a microcontroller and the microcontroller can be configured to adjust a sensitivity, which can include the sensitivity of sensing distance, of the through-the-wall motion sensor. The microcontroller can be configured to adjust an intensity of the indicator. The motion sensor detector can also include a light detector, and the microcontroller can be configured to adjust an intensity of the indicator based on an output of the light detector.

In one embodiment, the indicator preferably includes a light source. In one embodiment, the indicator can be configured to provide a first indicia to indicate the detection of motion of a subject moving toward the motion sensor apparatus and a second indicia to indicate the detection of motion of a subject moving away from the motion sensor apparatus. In one embodiment, the motion sensor apparatus does not communicate data wirelessly to a remote display device in a manner which requires a user to look away from the motion sensor apparatus.

Embodiments of the present invention also relate to a motion sensor apparatus having an enclosure including a top, a bottom, an inside and an outside; a through-the-wall motion sensor disposed at least partially inside the enclosure, the through-the-wall motion sensor directed out through and away from the bottom of the enclosure; an indicator configured to indicate motion of a subject detected by the through-the-wall motion sensor; and the indicator connected to or otherwise disposed at least partially within the enclosure such that indicia generated by the indicator is visible by a viewer while the viewer is simultaneously viewing a portion of the enclosure. In one embodiment, the motion sensor apparatus is configured to be powered by a battery and can optionally comprise one or more battery connectors.

Embodiments of the present invention also relate to a method for an operator on a first side of a wall to detect movement of a subject on an opposite side of the wall including attaching a through-the-wall motion sensor module to the first side of the wall, activating the through-the-wall motion sensor module, and observing indicia of movement by directly viewing the through-the-wall motion sensor module without requiring a user's eyes to be averted from an area of the wall where the through-the-wall motion sensor is attached. The method can include attaching the through-the-wall motion sensor to the wall with a pressure-sensitive adhesive.

Objects, advantages and novel features, and further scope of applicability of the present invention will be set forth in part in the detailed description to follow, and in part will become apparent to those skilled in the art upon examination of the following, or may be learned by practice of the invention.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION OF THE INVENTION

Figure 1A:
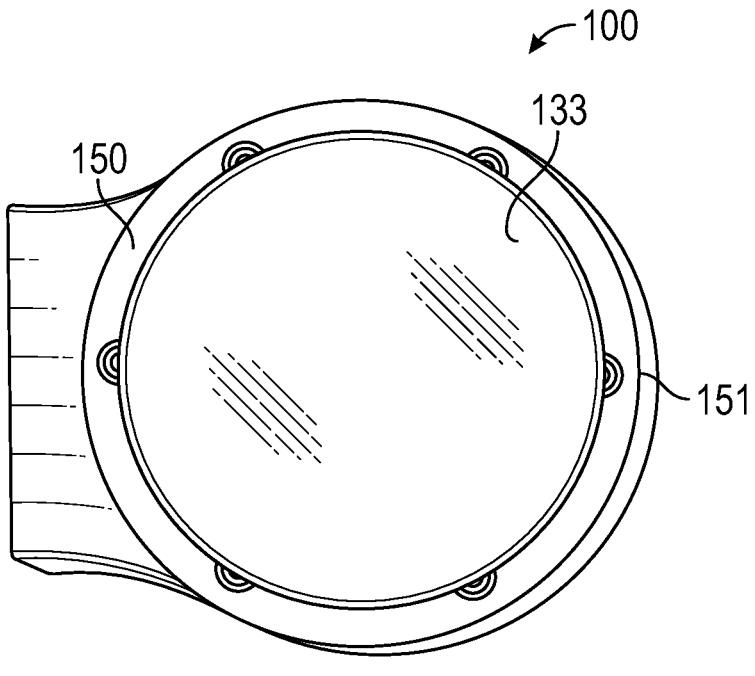
FIGS. 1A and 1B are drawings which respectively illustrate a top perspective view of a motion sensor module with a top and light diffuser installed (FIG. 1A) and with a top and light diffuser removed (FIG. 1B) to reveal internal circuitry.
Figure 1B:
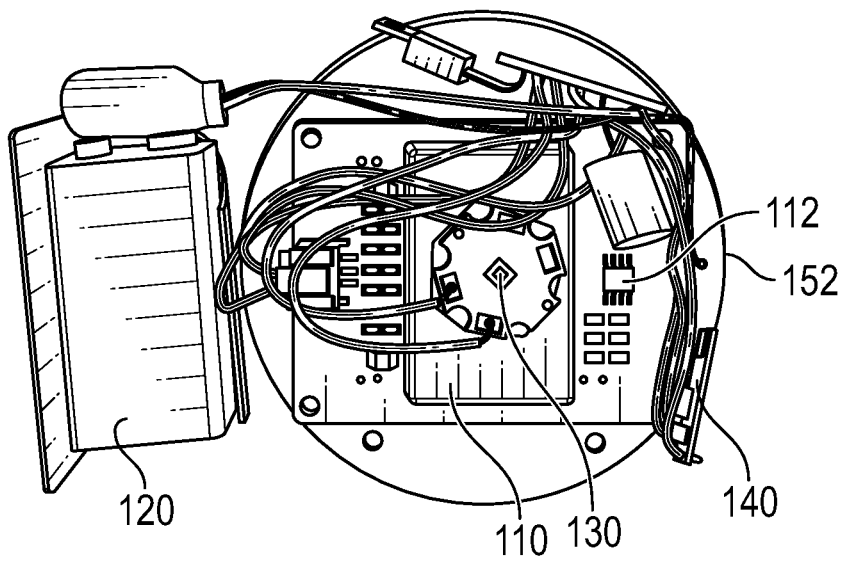
Figure 2:
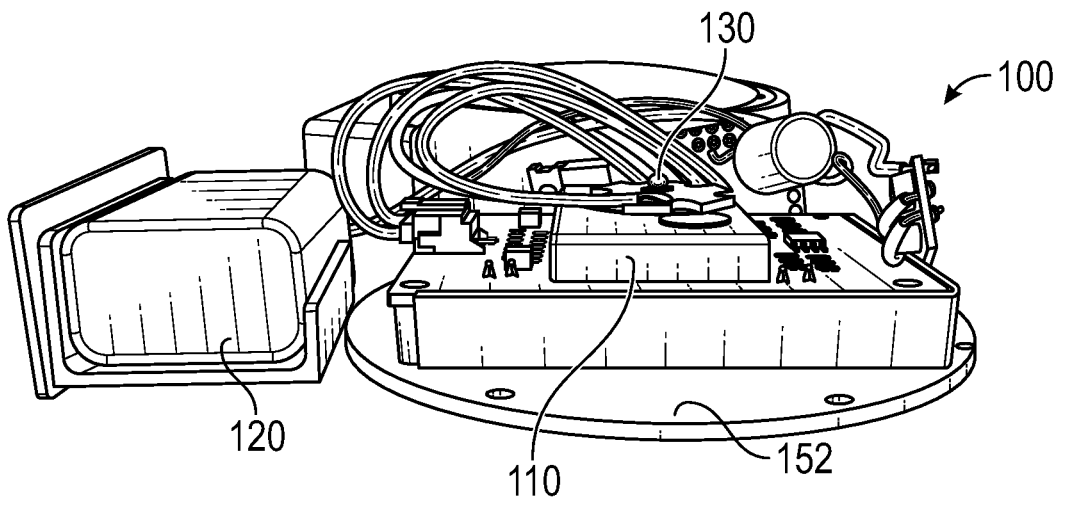
FIG. 2 is a drawing which illustrates a side view of a motion sensor module according to an embodiment of the present invention wherein a top portion of the enclosure has been removed to reveal the internal components.
Figure 3:
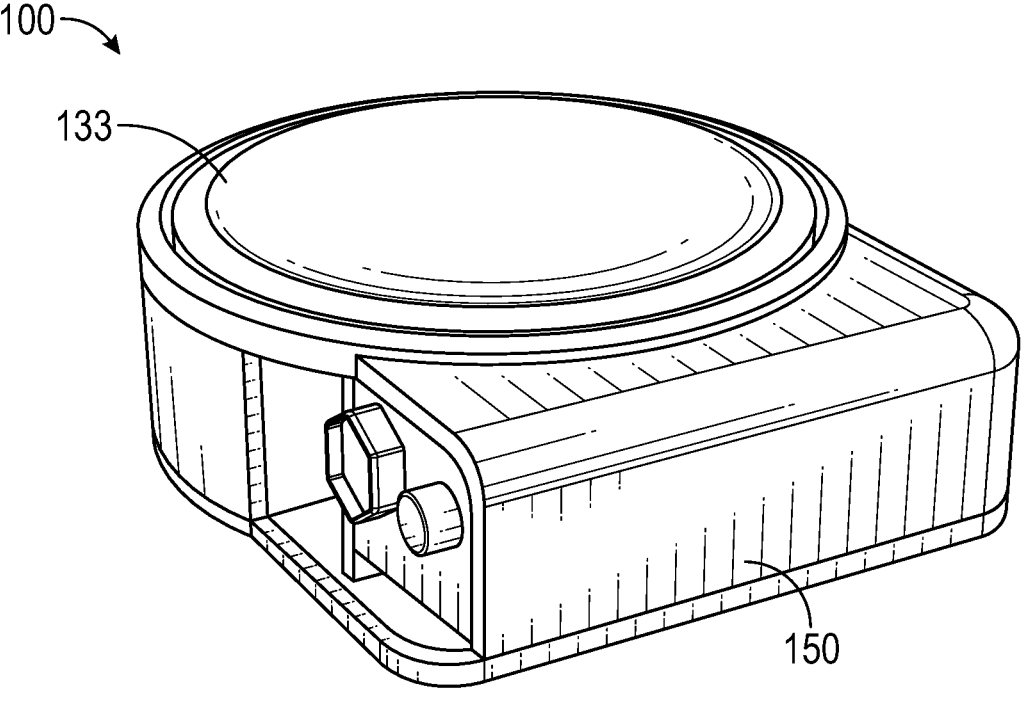
FIG. 3 is a drawing which illustrates a perspective view of a motion sensor module according to an embodiment of the present invention.
Figures 4A, 4B, 4C, 5A, 5B, 5C:
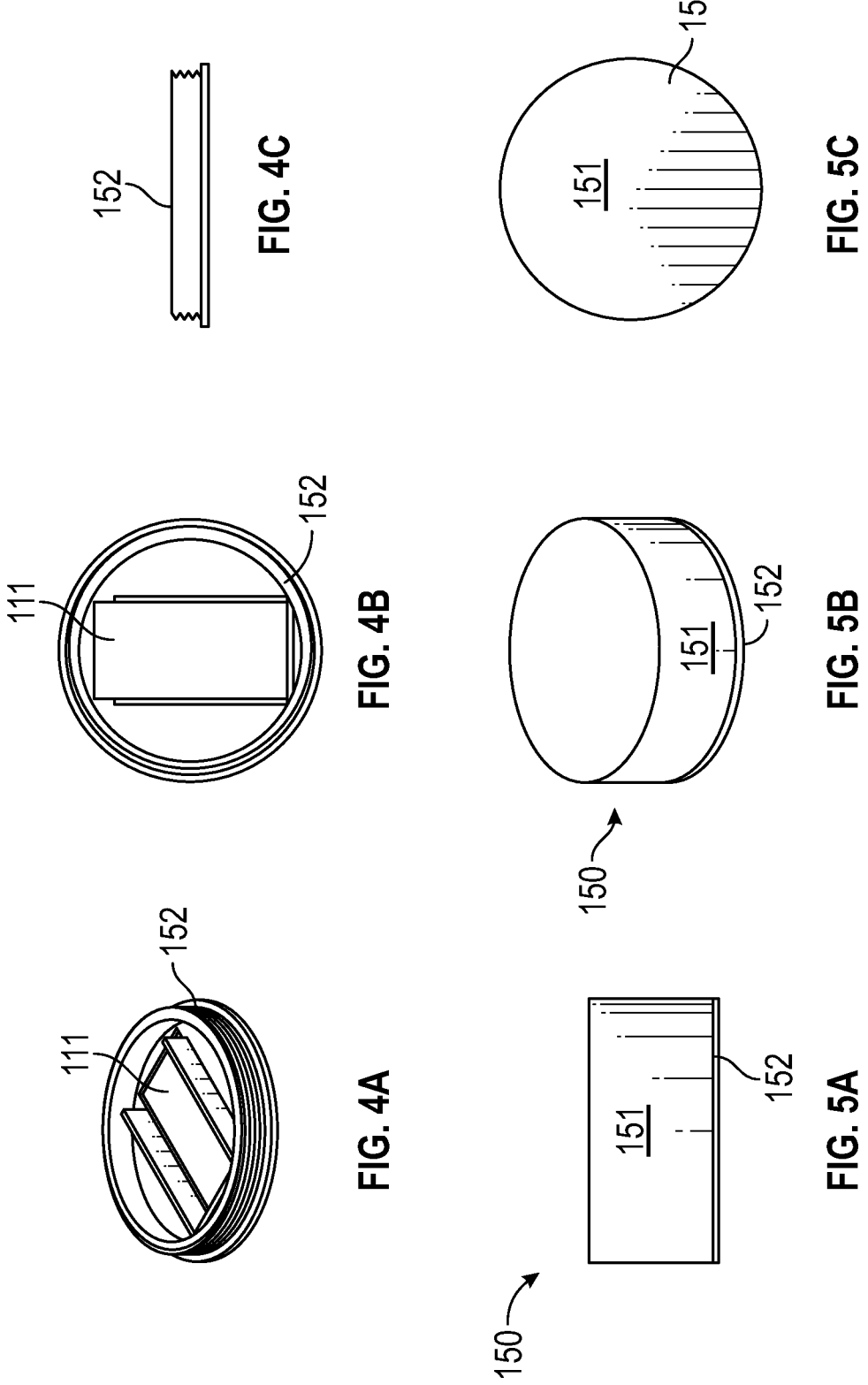
FIGS. 4A, 4B, and 4C respectively illustrate an elevated perspective view, a top view, and a side view of a base of an enclosure of a motion sensor module according to an embodiment of the present invention.
FIGS. 5A, 5B, and 5C respectively illustrate a side view, an elevated perspective view, and a top view of an enclosure of a motion sensor module according to an embodiment of the present invention.
Figures 6A, 6B, 6C, 6D, 6E:
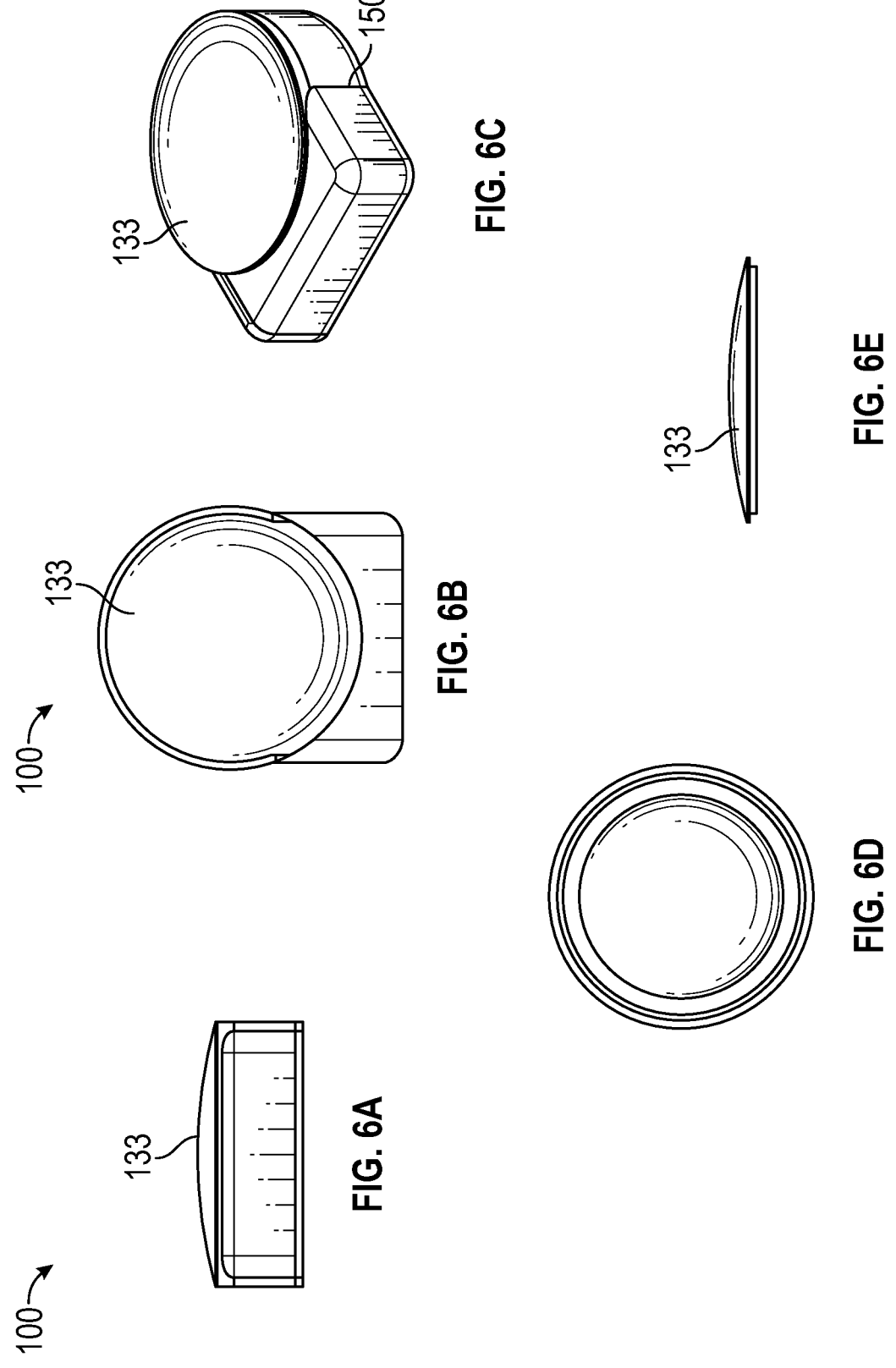
FIGS. 6A, 6B, and 6C respectively illustrate a front, a top, and an elevated perspective view of a motion sensor module according to an embodiment of the present invention.
FIGS. 6D and 6E respectively illustrate a bottom and a side view of a light diffuser of a motion sensor module according to an embodiment of the present invention.
Figure 7:
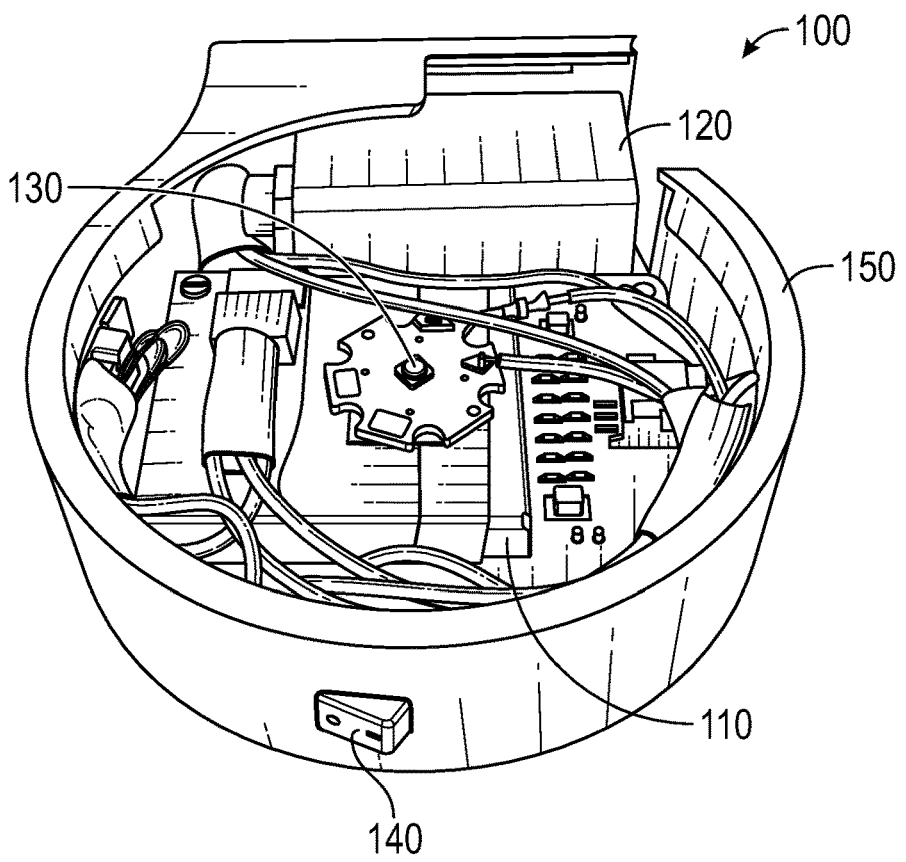
FIG. 7 is a drawing which illustrates the inside of a motion sensor module according to an embodiment of the present invention from a perspective view.
Figure 8:
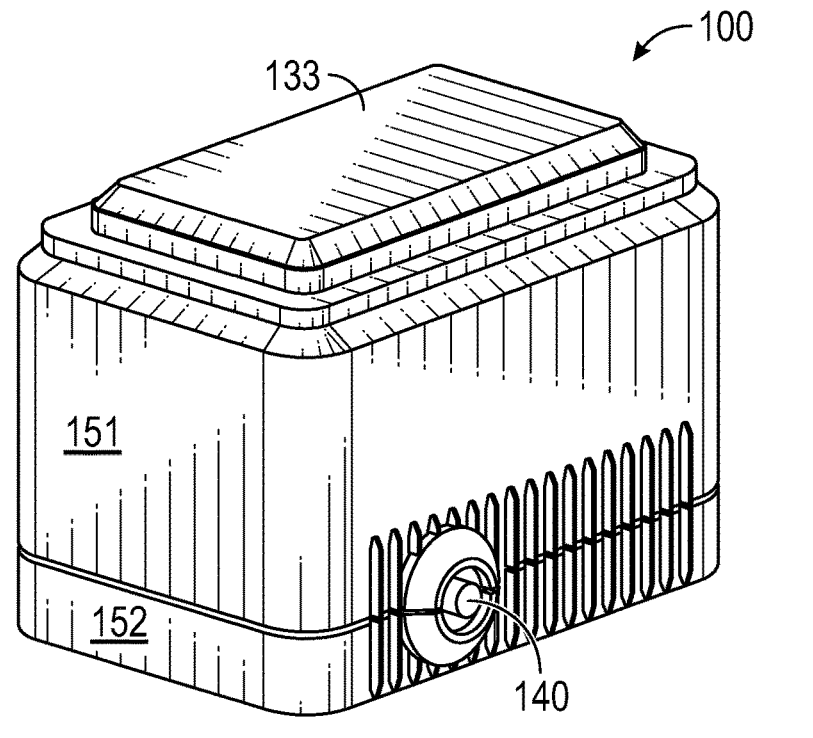
FIG. 8 is a drawing which illustrates a perspective view of the side and top of a motion sensor module according to an embodiment of the present invention.

As used throughout this application, the term "wall" is intended to include any structure of any shape and dimension that is difficult or impossible for a person to visually observe a subject through, but through which a through-the-wall motion sensor can sense movement, including but not limited to one or more of an opaque or translucent material, as well as any transparent structures including but not limited to windows or glass doors, and any obstacle. The term "operator" is intended to include any person operating the apparatus of the present invention, for example a law enforcement officer in a tactical operation, and any other person using the apparatus or within a visual distance of the apparatus. The terms "subject" or "subject person" are intended to include a person, animal or other movable object on the other side of the wall from the operator, such as a suspect or other dangerous person or dangerous animal.

Embodiments of the present invention include a motion sensor module that is preferably small enough to be quickly placed and securely attached to a wall, that indicates motion on the other side of the wall or obstruction, and that indicates the motion in a way that can be viewed from a distance (preferably up to about 300 feet or more) without continual manipulation by the operator and by more than one operator simultaneously. The motion sensor module is preferably a stand-alone discrete device disconnected from, and which does not communicate with, the other motion sensor modules to avoid the complexities and delays in communication that networked or transmitting motion sensor devices have. Embodiments of the motion sensor module can be produced cheaply enough that a number of them can be purchased and that can, in one embodiment, be rapidly dispensed in a tactical situation through an easy-to-use carrying dispenser that can optionally be carried by one operator. When the motion sensor modules are deployed in an array, even more information as to the subject's location and direction of movement can be inferred simply by an operator and/or other viewers simply observing the activation and deactivation of the motion sensor modules that make up the array.

Referring now to the figures, embodiments of motion sensor module 100 preferably include motion sensor 110, power source 120, indicator 130, activation switch 140 to turn motion sensor module 100 on and off, and enclosure 150. In one embodiment, adhesive 160 (see FIG. 9) is preferably disposed on a bottom of sensor module 100—most preferably by applying the adhesive across the back of the base of module 100, such that a user can simply peal a disposable protective sheet from the base of module 100, thus exposing the adhesive-coated base, at which point a user can simply press module 100 so that the adhesive-coated base is caused to contact and stick to the desired location on a wall.

Switch 140 preferably connects power source 120 to motion sensor 110 and associated electronics such that actuation of switch 140 engages the power supply and can optionally control modes of operation. In one embodiment, switch 140 is preferably disposed on motion sensor module 100 so it is automatically activated when motion sensor module 100 is stuck to, or otherwise placed against, a wall and so that it is not activated when motion sensor module 100 is stacked with other motion sensor modules 100, for example, by disposing switch 140 on motion sensor module 100 such that it nestles into a recess formed on an adjacently placed motion sensor module 100. The operator can then secure motion sensor module 100 on a wall or obstruction that may have a subject on the other side using adhesive 160 on base 152 of enclosure 150 at which point, switch 140 of this embodiment of motion sensor module 100 will be depressed by the wall, thus activating motion sensor module 100. The operator may then leave the area of the motion sensor module 100. In one embodiment, indicator 130 is preferably a light source formed from one or more lights-most preferably one or more high-intensity Light Emitting Diodes ("LEDs"). Indicator 130 is preferably incorporated into sensor module 100 such that it highly visible looking at the front of motion sensor module 100 and/or one or more sides thereof. Optionally, indicator 130 can be arranged to illuminate an area of the wall adjacent to motion sensor module 100.

When motion sensor module 100 detects motion of a subject on the other side of the wall within a detecting range, indicator 130 preferably indicates the movement to the operator or other tactical team members within the detecting range of indicator 130 by activation of indicator 130.

Preferably, enclosure 150 comprises top 151 that can optionally be removably secured to base 152 to enclose all of the functioning electrical components of motion sensor module 100 so that the components can be protected from the natural elements and be contained in a single module. Top 151 is most preferably the upper-portion, top, and/or highest part of motion sensor module 100 when motion sensor module 100 is placed on a horizontally oriented surface with base 152 positioned below top 151. However, when placed on a vertically oriented surface, including a wall, top 151 is not actually the "top" of motion sensor module 100 but rather is most preferably the portion of motion sensor module 100 that is nearer to the operator and base 152 is preferably nearer the wall than is top 151.

Figures 9, 10:
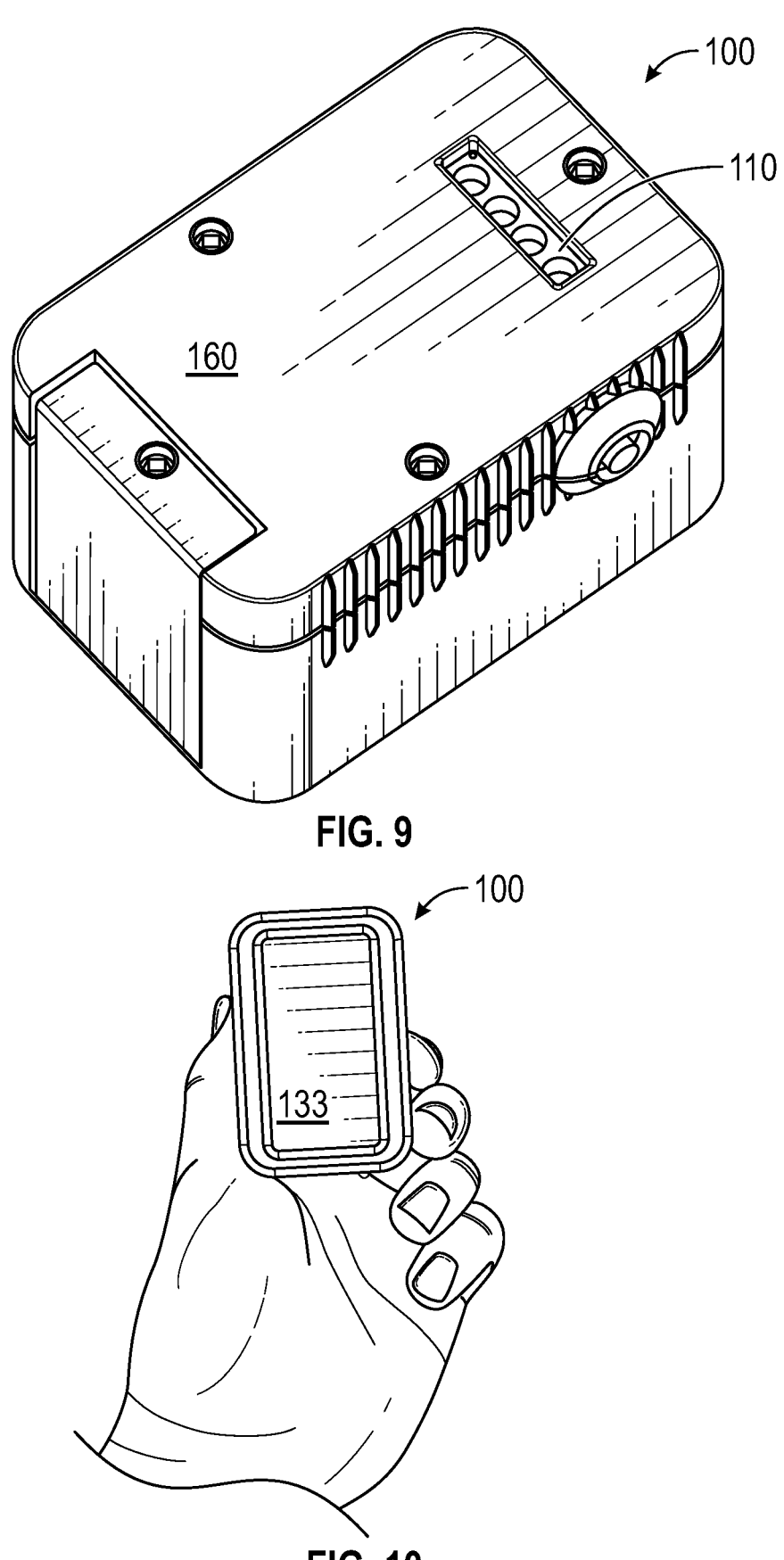
FIG. 9 is a drawing which illustrates a perspective view of the side and bottom of a motion sensor module according to an embodiment of the present invention.
FIG. 10 is a drawing which illustrates a top of a motion sensor module according to an embodiment of the present invention as the module is held in a person's hand.

Preferably, enclosure 150 is compactly sized, that is, sized to be held by a single hand of the operator as illustrated in FIG. 10 and/or to fit within the operator's pocket or pouch. Preferably, the length and width of enclosure 150 are from about one to about twelve inches, more preferably about two to about eight inches, and most preferably about two to about four inches. The height of enclosure 150 is preferably about one quarter of an inch to about six inches, more preferably half an inch to about four inches, and most preferably about one inch to about three inches. The compact size is preferably accomplished by using a small motion sensor 110, a small power source 120, which can include for example, a nine-volt battery, and compactly designing the internal circuitry, most preferably with surface-mount components. Round or cylindrical shaped embodiments of enclosure 150 are preferably about 37 millimeters to about 82 millimeters in diameter and about two inches to about four inches in height. Preferably, top 151 is a cylindrical hollow shape similar to the shape of a hockey puck, and base 152 is a circular plate of the same diameter as the top. Optionally, however, embodiments of enclosure 150 can be other shapes, including but not limited to cubical, rectangular, triangular, irregular, a combination there, and the like. For example, in one embodiment, enclosure 150 can be cubical or triangular to prevent rolling if motion sensor module 100 is to be thrown into place by the operator.

Top 151 can be coupled to base 152 via any desirable connection method or apparatus, including, but not limited to, an interference fit, and/or one or more fasteners (including but not limited to one or more screws, pins, tabs, combinations thereof, and the like). In one embodiment, base 152 and top 151 preferably comprise interfacing threads formed or disposed in or on a portion thereof, such that top 151 can be screwed onto or into base 152, thus enabling an operator to access one or more components inside motion sensor module 100 in the field-most preferably without use of tools. In any embodiment in which power source 120 comprises a battery, in one embodiment, motion sensor module 100 can be arranged such that an operator can optionally gain access to the battery by removing top 151. Top 151 preferably closes base 152 such that motion sensor module 100 is water-resistant and/or water-proof.

Embodiments of top 151 and base 152 preferably comprise coordinating elements that can include but are not limited to projections, slots, tabs, holes, etc. to secure and enclose between them the components of motion sensor module 100, as described further below. To diffuse or direct the signal emitted by indicator 130, enclosure 150 can be shaped accordingly. For example, enclosure 150 can comprise one or more windows, slots, openings, and/or light diffusers 133. For embodiments where indicator 130 is disposed within enclosure 150 and emits a light signal, enclosure 150 preferably comprises one or more windows within its top 151 to direct the light out of enclosure 150. Where indicator 130 is not disposed entirely within enclosure 150, it can be located on the outside surface of enclosure 150 with appropriate wiring through enclosure 150 to supporting circuitry.

To direct the motion sensing capabilities of motion sensor module 100 away from activity occurring on the operator's side of the wall and thus avoid false-positive activations of motion sensor module 100, while maintaining the ability to sense motion on the other side of the wall, top 151 is preferably lined, either within enclosure 150 or on its outside surface, with a shielding material 153 that can be a part of the material that forms top 151 or an independent material. Shielding material 153 is a material appropriate for shielding the reception of the particular motion sensor 110, for example, aluminum foil or copper mesh.

Embodiments of enclosure 150 preferably comprise adhesive 160, such as double-sided mounting tape, placed on the surface of enclosure 150 that contacts and secures motion sensor module 100 to the wall that separates the operator of motion sensor module 100 from the subject on the other side of the wall. In this way, motion sensor module 100 can be rapidly deployed in tactical situations with minimal modification—for example, by peeling off a protective layer of the adhesive and placing motion sensor module 100 at a strategic location on a wall. Some embodiments of motion sensor module 100 do not comprise adhesive 160, for example so that motion sensor module 100 can be launched with a launching device, placed on the ground, placed on a stand or otherwise pointed at the wall.

Embodiments of motion sensor 110 preferably employ through-the-wall motion-sensing technology such as continuous wave radar, ultra-wide band radar, micropower impulse radar or any other sensor that can sense motion on the other side of a wall ("through-the-wall motion sensor"), most preferably directed towards the surface of enclosure 150 that attaches to the wall so that motion on the other side of the wall is detected rather than motion on the operator's side of the wall. This can mean that the range of the sensing capabilities of motion sensor 110 is either entirely directed at the wall or at least the majority of the range directed at the wall. In one embodiment, motion sensor 110 can be mounted to the inside surface of base 152 by plastic projections formed with the base and placed such that motion sensor 110 directs and receives its signals primarily through base 152, rather than primarily through top 151. Alternatively, an antenna that emits such energy can optionally be disposed on a bottom of enclosure 150. In yet another embodiment, an opening can be disposed in enclosure 150 such that at least a portion of the detecting energy can exit enclosure 150 by passing through the opening.

Motion sensor module 100 can optionally comprise other types of motion sensing technology, for example, passive-infrared (PIR) sensing technology can be used and positioned such that it is directed away from the wall to detect movement on the operator's side of the wall. In embodiments employing additional motion sensors, motion sensor module 100 can be configured to turn off or turn down the intensity of the light emitted by indicator 130 to prevent false-positive readings from the through-the-wall motion-sensing technology and/or to prevent unwanted illumination of the operator if the operator moves near motion sensor module 100. This can include providing a delay on startup. Preferably, all the circuitry for all sensors in motion sensor module 100 are on one or two circuit boards in order to most efficiently use the space within enclosure 150 and to decrease the size of motion sensor module 100, but embodiments can comprise sensors on different circuit boards, or any number of circuit boards for any number of circuits with any function, including but not limited to one or more double-sided boards.

Motion sensor module 100 can optionally comprise other sensing capabilities, for example, sensors that sense red-shift and blue-shift can be used to indicate whether a person or object is moving toward or away from motion sensor module 100. Indicia relating to the red/blue shift differentiation can be displayed via a different color of emitted light from indicator 130, a different light pattern, a different flash pattern, a different flash rate, combinations thereof, and the like. Embodiments of motion sensor module 100 can comprise microcontroller 112 that regulates the sensitivity of motion sensor 110, for example, by varying the resistance that controls the sensitivity of the motion sensor. This can optionally be performed periodically, thus resulting in motion checks at different distances and allows the microcontroller 112 to determine a relative distance from the motion sensor module 100. Embodiments of motion sensor module 100 can comprise any number of motion sensors 110 that detect motion in the direction of any or all the top, base and/or sides of motion sensor module 100, but preferably comprise only as many motion sensors 110 as can be fit in a motion sensor module 100 that can be held in a single hand of the operator.

In another embodiment, enclosure 150 is preferably formed of a rigid and water-resistant material, capable of at least somewhat enclosing the functioning components of motion sensor module 100 and most preferably sealing the components from the natural elements. In another embodiment, enclosure 150 preferably does not substantially interfere with the motion sensing capabilities of motion sensor 110 in the direction of the desired motion sensing. In another embodiment, enclosure 150 is preferably formed from a plastic material, a metal material, a combination thereof, and the like.

Top 151 and base 152 can optionally be formed from different materials. For example, in another embodiment, top 151 can be formed of a material that blocks the signals necessary to sense motion so that the detection of activity on the operator's side of a wall is attenuated such that it does not set off indicator 130. In this embodiment, base 152 preferably comprises a material or comprises a shape that does not attenuate the signals necessary to sense motion, or which attenuates the signals to a lesser degree than does top 151. In another embodiment, top 151 and base 152 can be formed from the same material and can comprise materials that interfere with the motion sensing capabilities of motion sensor 110 to shield or direct the motion sensing capabilities in certain directions, for example a layer of shielding material on the inner side of top 151. The shielding material may be of varying density or layered in multiple layers in various locations within enclosure 150 to create the desired range and/or sensing area of motion sensing ability of motion sensor module 100. In another embodiment, base 152 and top 151 are not distinct parts of enclosure 150 but are a single unit enclosing the components of motion sensor module 100, the components accessible or placed within enclosure 150 through holes, windows, etc.

Embodiments of indicator 130 preferably comprise a light and/or a plurality thereof, to convey that motion was detected. In one embodiment, indicator 130 can comprise one or more conventional light bulbs, one or more LEDs, one or more strobe lights (for example a xenon gas bulb), any other electrically-activated or electrically-powered lighting apparatus, a combination thereof, and the like. Indicator 130 enables the operator of motion sensor module 100 to receive the indication of motion at any distance within the visible range of the emitted light, preferably at a distance of at least 300 feet which is typically considered a safe distance in most tactical operations. In most tactical situations, operators are within viewing distance of the wall in front of the subject. By providing a light-based signal, the detection of motion by motion sensor module 100 can be instantaneously transmitted to all operators within the viewing range without the need for an intermediate communication and without the need for the operators to remove their view from their scope or to instead look down to a monitor or display. Additionally, light is silent and minimizes the risk of alerting the subject that his or her motion on the other side of the wall is being detected, while maximizing the chance that operators will see the signal. The light diffuser can comprise a fluorescent material that shifts the wavelength of light passing through or from an efficient photon emitter color such as royal blue or ultraviolet to a more visible color including, but not limited to, green or yellow. Embodiments of indicator 130 are not limited to light indicators, but can comprise other types of indicators, including but not limited to sound indicators such as buzzers, beeps, etc., or any combination thereof. Embodiments of motion sensor module 100 can comprise any number of indicators 130, placed on any location of motion sensor module 100.

Preferably, indicator 130 is directed away from the direction of motion sensing so that the operators on the side of the wall with the motion sensor module 100 can be alerted to motion occurring on the other side of the wall where the subject resides. This can mean that indicator 130 is itself located on top 151 and pointed away from the wall. Optionally, indicator 130 can be directed at the wall as well, so as to illuminate the area of the wall around motion sensor module 100 when motion is detected. Indicator 130 can emit light of any color. In an embodiment comprising a red-shift and/or blue-shift capable sensor, then indicator 130 preferably comprises more than one color, as capable of being measured by the human eye and distinguished by a person or ordinary visual abilities. For example, the color red can be used to indicate motion moving away from motion sensor module 100 while another color, for example blue, can be used to indicate motion moving toward motion sensor module 100.

Figure 15:
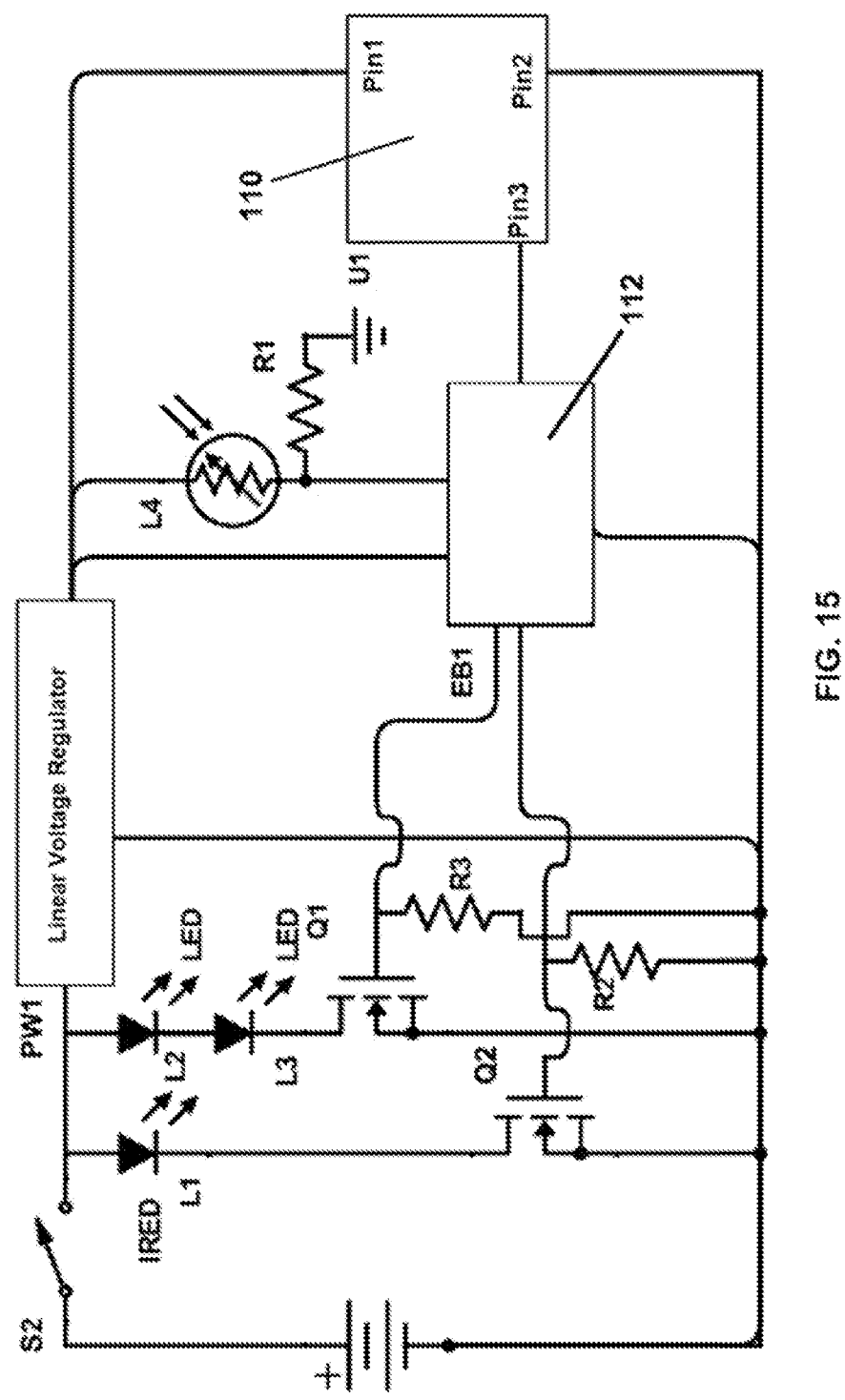
FIG. 15 is a circuit diagram which illustrates an indicator circuit according to an embodiment of the present invention.

In another embodiment of the present invention, indicator 130 can include one or more LEDs of a single color disposed on or within, or incorporated into, enclosure 150, and the LEDs can be connected to an indicator circuit to be illuminated when the indicator circuit is activated. Optionally, the LEDs can be built into or otherwise be disposed on or within the enclosure with a heatsink and an indicator circuit (see FIG. 15) comprising current control circuitry, ensuring that the light is pulsed on with a duty cycle less than 100% so as to improve visibility of the light during daytime, reduce power consumption of the light, and/or reduce the amount of heat generated. Preferably, the indicator circuit also comprises a light dependent resistor, photo-diode, and/or solar cell to monitor the level of ambient light so that the intensity of the LEDs can be reduced through pulse width modulation to avoid temporarily blinding the operator in low-light situations. Optionally, of course, the indicator circuit can be incorporated into the reset of the circuitry of motion sensor module 100. Microcontroller 112 can be configured to interpret the output of the light dependent resistor, photo-diode, or solar cell and to adjust the signal to indicator 130 to adjust the brightness of indicator 130. Indicator 130 can be used as both a light sensor and a light output if microcontroller 112 measures the analog voltage produced by the light of indicator 130 as a photovoltaic function relative to the amount of light taken in by the light indicator 130 during "off" periods.

Indicator 130 can emit light in any desired manner, including flashing signals, illuminating patterns, and/or providing a continuous non-flashing signal. In another embodiment, if motion is detected, indicator 130 can optionally indicate the detection for a predetermined amount of time before returning to a non-indicating state. In this embodiment, motion sensor module 100 can optionally cease detection of motion while indicator 130 is activated before subsequently resuming detection. If the detected movement on the other side of the wall is moving back and forth across the sensing range of multiple motion sensor modules 100, the back and forth movement can be indicated. If only a single motion sensor module 100 is in use, that single module can again indicate that the subject has moved back into its sensing range.

Embodiments of indicator 130 can optionally convey the relative distance from the sensor by changing some aspect of the indication indicia. For example, this can be done by changing the frequency the light blinks, changing the intensity of the light emitted, or by altering the color of the output light. In one embodiment, a first color can be emitted to indicate motion far from the sensor module and a second color can be emitted to indicate motion near the sensor module, thus allowing for a more precise approximation by an observer of the location of the detected movement relative to the motion sensor module 100.

In another embodiment, indicator 130 can emit an infrared signal, either as an alternative to visible light, or in conjunction therewith. Thus, indicator 130 can comprise one or more light emitting diodes, one or more infrared emitting diodes and/or a combination thereof.

In another embodiment, power source 120 can optionally comprise a mount disposed or incorporated within or on enclosure 150 that holds a battery of power source 120 that powers motion sensor 110 and indicator 130. In this way, power source 120 can be protected from the natural elements and from abuse inherent in tactical situations. Depending on the power requirement of the various components of motion sensor module 100, embodiments of motion sensor module 100 can comprise any number of power sources, but most preferably only as many as can be held by a single hand of the operator.

In one embodiment, power source 120 preferably comprises power sources that are small and commonly available, for example CR123 batteries, 9-volt batteries, and/or other commercial off-the-shelf batteries, which can include lithium-ion batteries, rechargeable batteries, combinations thereof, and the like. Enclosure 150 can comprise any number of structures, including but not limited to a mounting mechanism, or structures that can optionally be disposed or incorporated in any position within enclosure 150 for providing power, including an enclosure top 151 that is configured to hold an additional battery source to increase the battery life of motion sensor module 100.

Power source 120 is preferably electrically coupled to other components of motion sensor module 100 via actuation of switch 140, which most preferably occurs when motion sensor module 100 is in use, and switch 140 is most preferably configured to deactivate when it is not in use. For example, switch 140 can comprise or otherwise be mechanically coupled to a button or other structure on top 151 of enclosure 150, and a power control circuit and a voltage regulator can also optionally be provided. In one embodiment, the same switch 140 can be used to select between visible and infrared, or between different motion detection distances. Switch 140 can be a single switch or can optionally comprise multiple switches, and can be disposed in any place on motion sensor module 100, including on the outside surface of the base of motion sensor module 100 that can activate motion sensor module 100 when it is adhered to a wall. As described below, switch 140 can be engaged to activate motion sensor module 100 by dispenser 200 as motion sensor module 100 is dispensed out of dispenser 200 and/or disengaged to deactivate motion sensor module 100 as it is replaced in dispenser 200. For example, a side of motion sensor module 100 can feature switch 140 that can be depressed and which is in a normally closed electrical configuration and which is configured such that switch 140 is activated into its open configuration by a physical interaction between the switch and a component of dispenser 200. In this embodiment, when motion sensor module 100 is dispensed from dispenser 200, switch 140 can return to its normally closed configuration, thus initiating activation of motion sensor module 100. Switch 140 can comprise solid-state proximity switches disposed both on top 151 and base 152 operating in conjunction with microcontroller 112 to sense when switch 140 is contacting a wall and out of dispenser 200 and/or when switch 140 is inside dispenser 200.

Embodiments of the present invention can include a carrying dispenser 200 to carry and dispense multiple motion sensor modules 100. Preferably, dispenser 200 is shaped so as to stack each motion sensor module 100 one on top of the other within dispenser 200. Preferably, dispenser 200 is sized and shaped to allow a person to easily carry at least three motion sensor modules 100. The dispenser is preferably sized to fit in, or be supported by, a pouch or pocket that is worn or carried by the operator. If motion sensor modules 100 are cylindrically shaped, dispenser 200 would preferably also be cylindrically shaped and would be of a diameter only slightly larger than the diameter of each motion sensor modules 100 to allow each motion sensor module 100 to fit within the walls of the dispenser and to move up and down within the dispenser. Dispenser 200 can be of any height to contain any desired number of motion sensor modules 100, but preferably dispenser 200 is sized to contain at least three motion sensor modules 100, and preferably has a height of about 4 to about 24 inches and most preferably a height of about 6 to about 12 inches. However, embodiments of dispenser 200 can be provided in any shape or size appropriate or useful for a tactical situation. Optionally, dispenser 200 can be shaped to have an internal space and internal dimensions configured to accommodate a plurality of stacked motion sensor modules 100.

Dispenser 200 preferably comprises a sensor module slot 210 disposed within a vertical side of dispenser 200 near its top through which a motion sensor module 100 can pass as it enters and exits dispenser 200. Optionally, finger slot 212 at the top surface can also be provided which extends down a portion of the vertical side of dispenser 200 so the operator can use his or her finger to push motion sensor modules 100 down against an upward pressure of mechanical dispensing system. Preferably, dispenser 200 comprises a top housing 230 and a bottom housing 232 that are removably attachable to each other such that they can be separated to provide access to motion sensor modules 100 without having to dispense them through slot 210. For example, top housing 230 and bottom housing 232 can comprise threads 234 to screw together, or top housing 230 may be sized to provide an interference fit within or on bottom housing 232 by pressing the two together. Optionally, nut 233 can be screwed onto threads 232 and/or 234.

In order to ensure easy dispensing of each motion sensor module 100, dispenser 200 preferably comprises a mechanical dispensing system, such as a platform that is configured to apply pressure towards the top of dispenser 200 by one or more springs attached to the inside bottom of dispenser 200—for example in a configuration similar to that of a detachable rifle magazine Preferably, the one or more springs are calibrated and of a length to apply just enough upward pressure to apply a force adequate to drive the motion sensor modules 100 contained within dispenser 200 upwards to the top of dispenser 200. In this way, motion sensor modules 100 may be loaded into dispenser 200 through slot 210, atop one another, and dispensed out of slot 210, one after the other. In another embodiment, dispenser 200 can be constructed to function in an opposite manner such that motion sensor modules 100 are dispensed from the bottom of dispenser 200 instead of from the top of dispenser 200. Dispenser 200 can comprise projections or can be shaped so as to engage switch 140 as motion sensor module 100 with switch 140 passes through slot 210 or moves up or down within dispenser 200 or otherwise comes into contact with another motion sensor module 100 when stacking together within dispenser 200. In this way, when motion sensor modules 100 are within dispenser 200, they are deactivated, but when they are dispensed, they are automatically activated without a separate operator's action, thus providing rapid deployment.

Figure 11B:
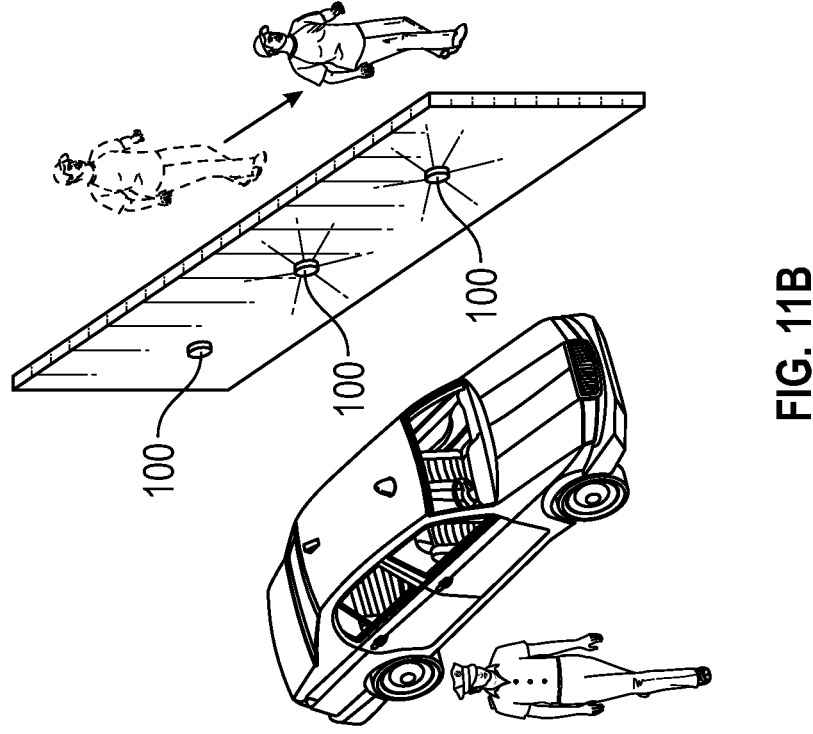
FIGS. 11A and 11B are drawings which respectively illustrate an array of motion sensor modules in use according to an embodiment of the present invention, FIG. 11A illustrating use of an array when a person on the other side of the wall from an operator is not moving, and FIG. 11B illustrating use of an array when a subject on the other side of the wall is moving.
Figure 11A:
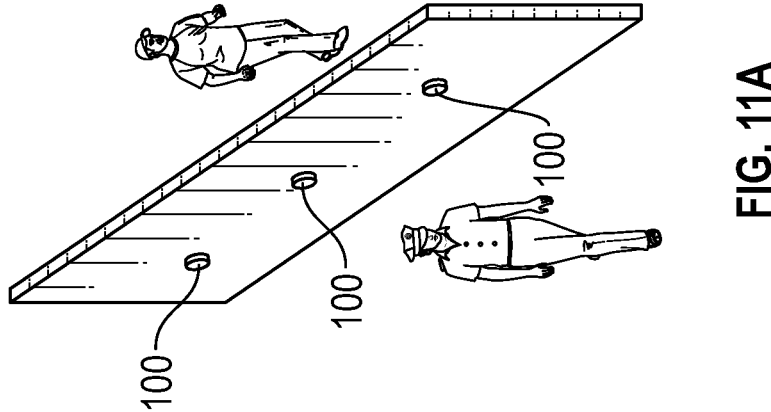
Figures 12A, 12B, 12C, 12D, 12E, 12F, 12G, 12H, 12I, 12J, 12K:
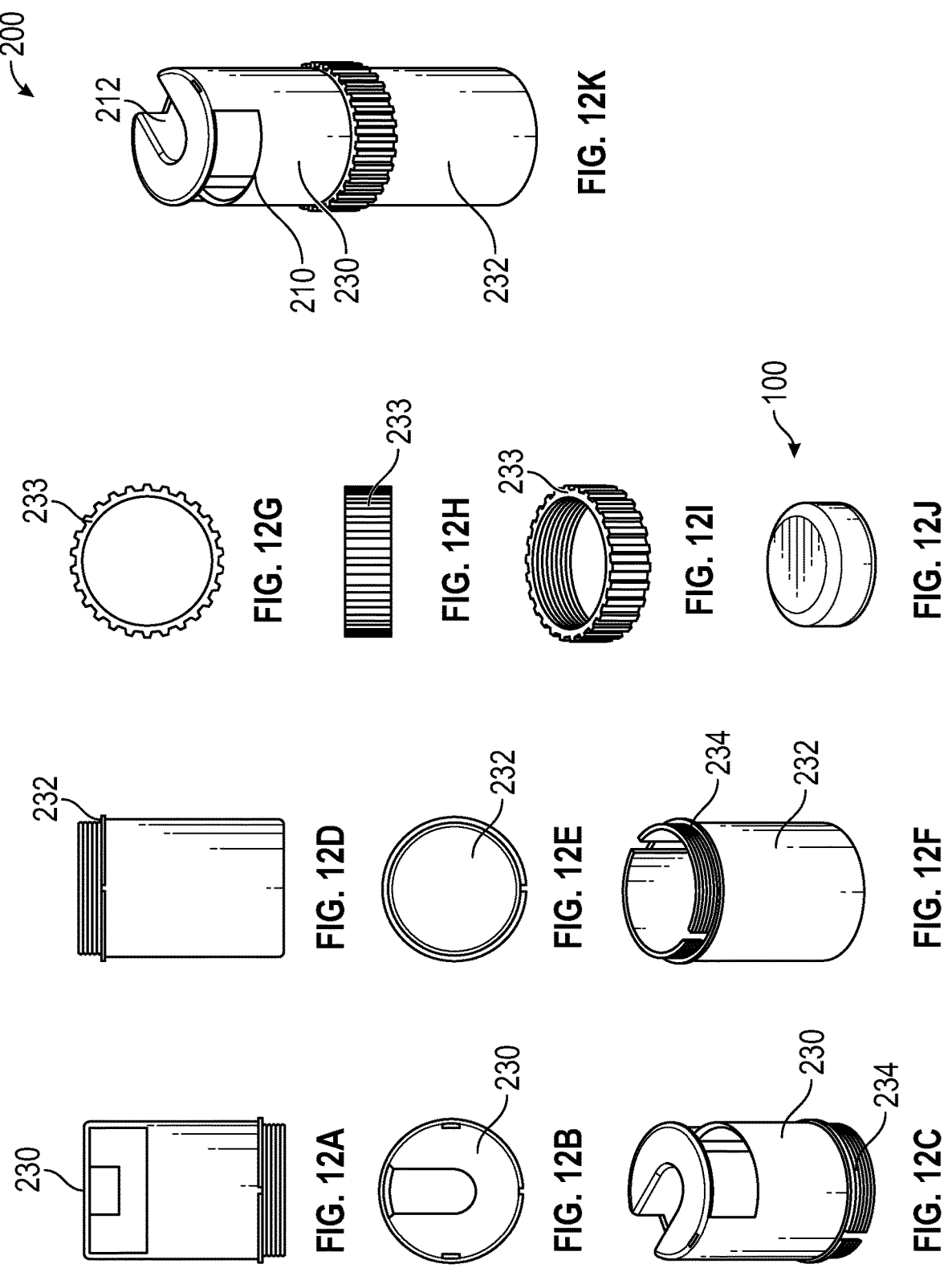
FIGS. 12A, 12B, and 12C, respectively illustrate a side view, a top view and an elevated perspective view of a top housing of a dispenser according to an embodiment of the present invention.
FIGS. 12D, 12E, and 12F respectively illustrate a side view, a top view, and an elevated perspective view of a bottom housing of a dispenser according to an embodiment of the present invention.
FIGS. 12G, 12H, and 12I, respectively illustrate a top, side, and elevated perspective view of a nut according to an embodiment of the present invention.
FIG. 12J illustrates an elevated side view of a motion sensor module that can fit within a dispenser according to an embodiment of the present invention.
FIG. 12K is an elevated perspective view of a dispenser according to an embodiment of the present invention.

In the manner described above, dispenser 200 can be loaded prior to commencement of the tactical situation with a plurality of motion sensor modules 100 and optionally be carried in a common rifle magazine pouch on the operator's person. Motion sensor modules 100 can be quickly removed from dispenser 200 with one hand and stuck to a wall or obstruction, for example via adhesive 160. The operator can place a number of motion sensor modules 100 on a wall in an array appropriate for the operator's tactical strategy and then retreat to a position of cover and watch the wall. FIGS. 11A and 11B illustrate one way of setting up an array of motion sensor modules 100. When movement is detected on the other side of the wall by a motion sensor module 100, the affected sensor will activate indicator 130 so that the operator can be informed of the approximate location of the movement. Where multiple sensors are activated, the operator can infer the direction of the movement based on the sequence of activations. As the subject moves in a direction, motion sensor modules 100 light up sequentially corresponding to the direction of the subject's motion.

A number of motion sensor modules 100 can be placed along a wall with any desired spacing between them so that each motion sensor module 100 is within the detection distance of the motion sensor module 100 next to it so that movement on the other side of the wall will be indicated by two or more motion sensor modules 100, thus reducing the potential for false positive indications. The closer each motion sensor module 100 is placed to the other, the more accurately the motion will be detected.

Other embodiments of the motion sensor modules 100 can also be provided. For example, motion sensor module 100 can be miniaturized. A miniaturized embodiment of motion sensor module 100 preferably comprises an enclosure 150 that is only large enough to house the motion sensor 110, a visible indicator 130, supporting electronics and switch 140. Power source 120 can be either inside or outside enclosure 150, allowing the whole size of the motion sensor module 100 to be approximately the size of two 9-volt batteries.

In another embodiment, motion sensor module 100 can receive signals from a remote device, for example, a radio frequency or infrared remote that sends a signal to a receiver within motion sensor module 100 that can be used in lieu of or that can engage or bypass switch 140 to turn motion sensor module 100 on or off. Preferably, the remote is multi-channel or capable of generating a plurality of different key-codes so that each motion sensor module 100 can be afforded a separate channel or key-code so that each motion sensor module 100 individually can be controlled remotely. In this embodiment, when microcontroller 112 of each motion sensor module 100 receives the correct key-code from the remote, it will thus accept instructions from the remote.

In another embodiment, motion sensor module 100 can be shaped and/or formed of a material so as to be deployed as a projectile, for example by launching from a dispenser (including but not limited to a 40 mm munition launcher) and/or by throwing it by hand, to attach motion sensor module 100 to a wall, rather than being placed by hand on a wall. Some embodiments of motion sensor module 100 used as projectiles do not have an adhesive 160 so as to not interfere with the launching mechanism or the placement of motion sensor module 100. Motion sensor module 100 can also coordinate with a robot, for example by connecting it to a robot using the robot as power source 120, or simply using the robot to deploy motion sensor module 100 as an ordinary human operator would.

Embodiments of the present invention serve to avoid unnecessary delays in sensing and indicating motion that can be caused by, for example, networking devices that can delay transmission of information from motion sensor 110 to an operator. To avoid the delay, preferably, embodiments of motion sensor modules 100 comprise no networking devices, such as radio communication devices that would communicate information between two motion sensor modules 100 or between a motion sensor module 100 and a remote display.

Embodiments of the present invention serve to avoid unnecessary delays in sensing and indicating motion that can be caused by, for example, displays that distract an operator's attention away from the motion sensor module 100 itself. A display that is remote from motion sensor module 100 itself would require motion sensor module 100 to communicate the motion information from sensor 110 to the remote display and would then require the operator to look at the remote display to determine if motion was sensed. To avoid that delay, preferably, embodiments of motion sensor modules 100 do not comprise a remote display device and motion sensor module 100 preferably does not comprise the ability to wirelessly transmit data from motion sensor modules 100 to a receiver. In one embodiment, no external devices are required to activate, operate, and interpret data from motion sensor modules 100. In one embodiment, motion sensor modules 100 comprise everything needed to detect a subject and alert an operator in a single, non-tethered unit.

INDUSTRIAL APPLICABILITY

The invention is further illustrated by the following non-limiting example which illustrates one possible scenario of how a plurality of motion sensor modules 100 can be used.

Example 1

A number of motion sensor modules 100 and dispenser 200 are preferably deployed as an array in the following way. A number of motion sensor modules 100 are preloaded into dispenser 200 and the operator (for example, a tactical police officer) places loaded dispenser 200 in the pouch of the operator's tactical operations vest or on a belt. The operator approaches the wall behind which the operator suspects there may be movement of a subject person. The operator presses a motion sensor module 100 out of dispenser 200 by placing the operator's thumb into dispenser thumb slot 212 and pushing the motion sensor module 100 out of the sensor module slot 210. With motion sensor module 100 in one hand, the operator then removes the protective plastic film covering adhesive backing 160 of the motion sensor module 100. The operator then presses motion sensor module 100 onto the wall such that adhesive 160 secures motion sensor module 100 on the wall, and the operator engages switch 140. A timer function of motion sensor 110 allows the operator a prespecified amount of time to walk away from motion sensor module 100 before indicator 130 is allowed to turn on so as to prevent the operator's movement from turning indicator 130. The operator moves away from motion sensor module 100, dispenses another motion sensor module 100 from dispenser 200, and places another motion sensor module 100 further down the wall at a distance where the range of the second motion sensor module 100 overlaps to some extent with the first motion sensor module 100 so that both the first and second sensor modules would sense motion to avoid false indications of movement. The operator then activates switch 140 on the second motion sensor module. A third motion sensor module 100 is placed outside the range of the first motion sensor module 100, but overlapping to some extent with the range of the second motion sensor module 100, so that a direction of movement can be inferred if the subject on the other side of the wall is moving away from the first motion sensor module 100 towards the third motion sensor module 100. The operator then activates switch 140 on this third motion sensor. In this fashion, the operator places as many motion sensor modules 100 as is practical for the length of the wall, and retreats away from the wall to a position from which the operator and other tactical operators can visually observe indicator 130 on motion sensor modules 100.

Once the internal startup timers of motion sensor modules 100 finish counting down, motion sensor modules 100 begin to monitor motion. If the subject on the other side of the wall moves, motion sensor modules 100, within sensing range of that motion, preferably sense the motion and activate indicator 130. In this way, the operator is able to determine the relative position and direction of the movement based on the order and location which motion sensor modules 100 indicate. This gives the operator and other tactical operators the information of movement simultaneously, and they are able to safely coordinate apprehension of the subject person without disruptive communication about the location and direction of the subject person.

With the subject person apprehended, motion sensor modules 100 are preferably removed from the wall by hand by simply applying adequate force to overcome adhesive 160. Optionally, adhesive 160 is then removed from each motion sensor module 100 and used adhesive 160 is replaced with fresh adhesive 160 so that motion sensor module 100 is ready to use for future deployments. In one embodiment, each motion sensor module 100 is then preferably replaced in dispenser 200 by inserting it into sensor module slot 210 and applying pressure downwards to the top of the sensor module through finger slot 212 so that another motion sensor module 100 can be inserted. In one embodiment, motion sensor modules 100 do not emit a sound. In one embodiment, motion sensor modules 100 do not emit a tactile vibration. In one embodiment, aside from emitting visible light that is intended for visual observation by a user who is looking at it, motion sensor modules do not comprise the ability to communicate data wirelessly to another electronics device.

Figure 13:
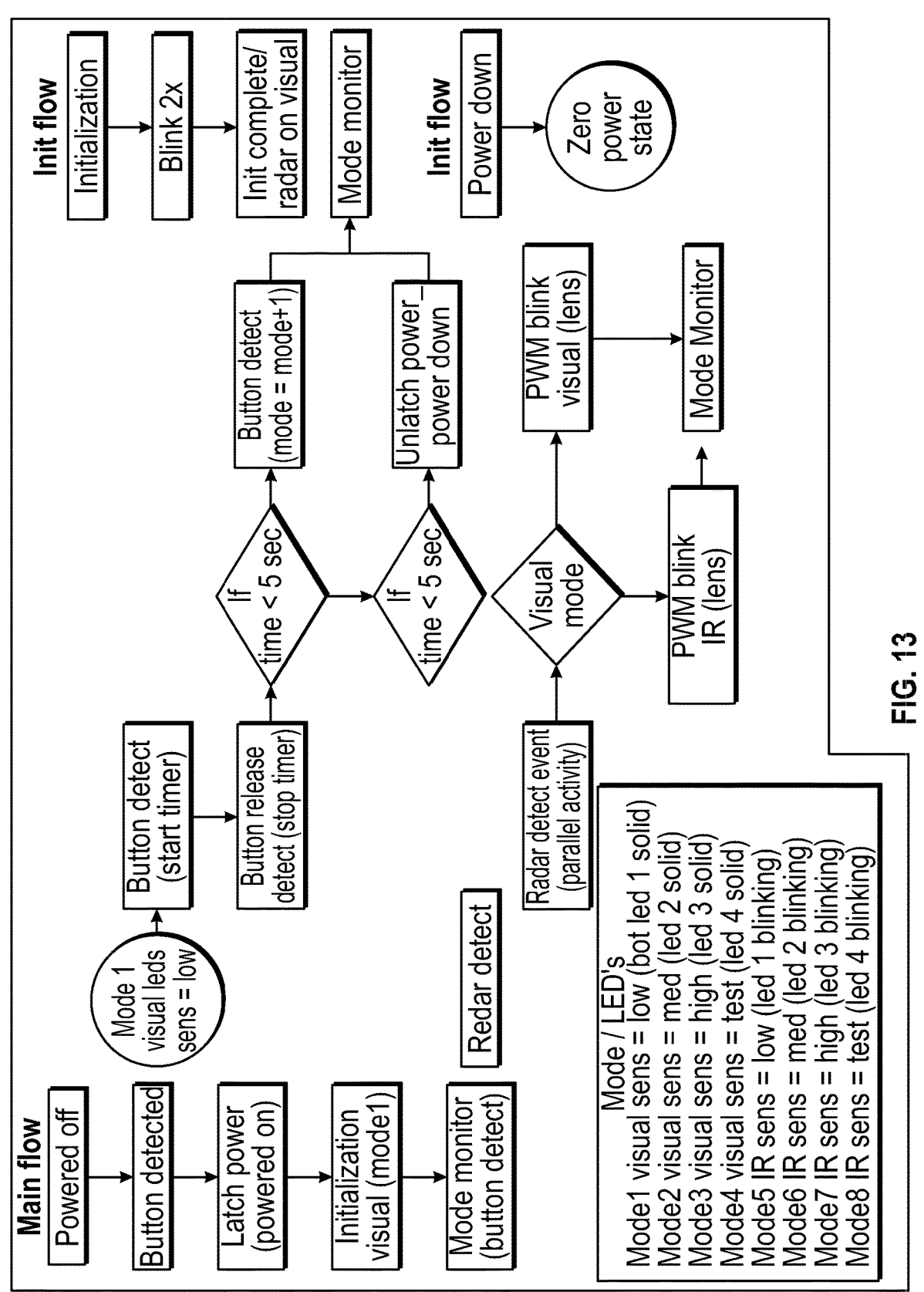
FIG. 13 is a drawing which illustrates flow charts for various control logic of an embodiment of the through-the-wall motion sensor according to an embodiment of the present invention.
Figure 14:
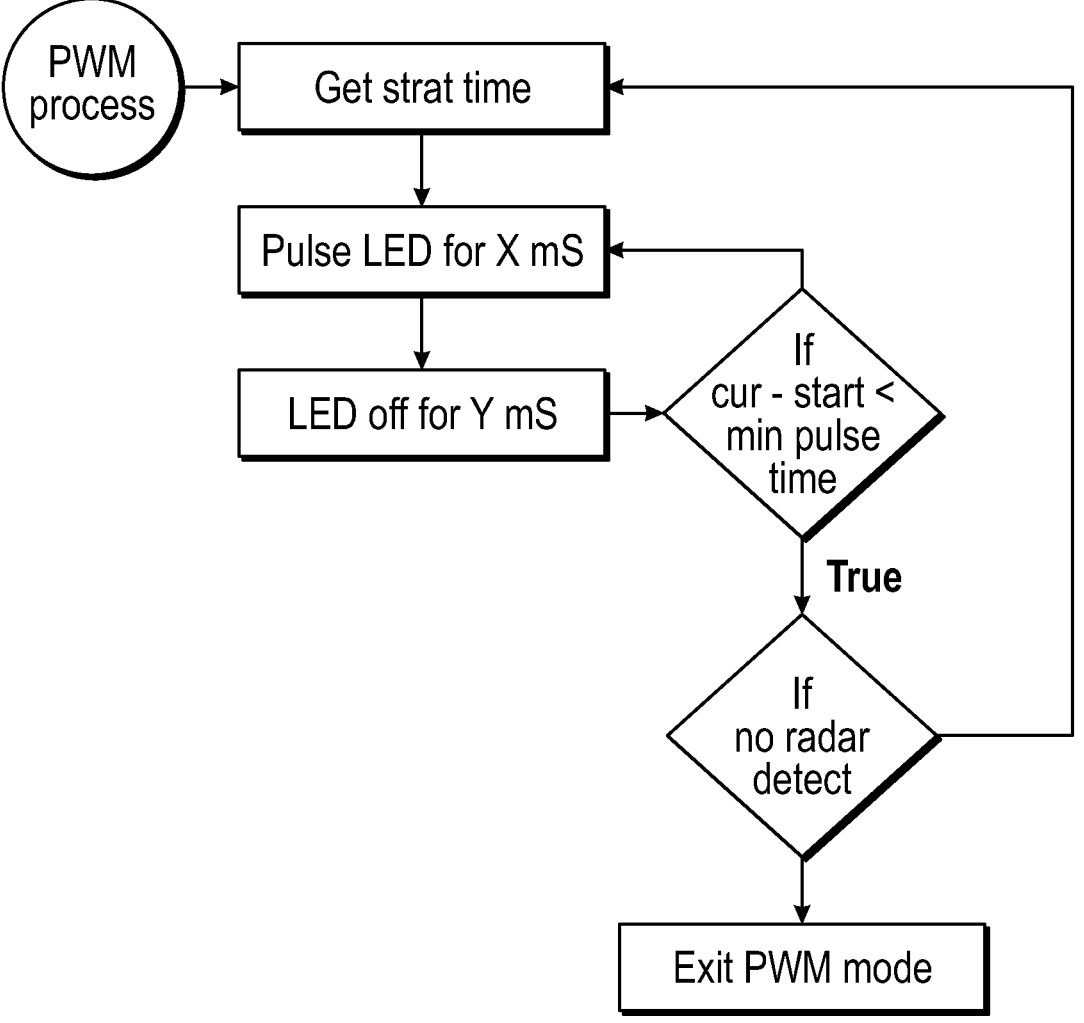
FIG. 14 is a diagram which illustrates control logic for a pulse-width modulation technique according to an embodiment of the present invention.

Various flows of control logic can optionally be programmed into microcontroller 112 to accomplish startup and initialization, detection of motion, and activation of one or more indicators as best illustrated in FIG. 13. For embodiments wherein pulse-width modulation of one or more indicators are desired, control logic in accordance with FIG. 14 is preferably provided. Of course, the control logic illustrated in FIGS. 13 and 14 is merely for illustrating a most preferred embodiment and numerous other arrangements of control logic can be used and will provide desirable results.

In one embodiment, motion sensor modules 100 communicate with an observer without requiring a user to look at some device that is remote from the motion sensor module 100. In one embodiment, motion sensor modules do not comprise Bluetooth communication capabilities. In one embodiment, motion sensor module 100 does not comprise an antenna for transmitting data to another electronic apparatus. In one embodiment, motion sensor module 100 is disposed on a first side of a wall and senses movement on a second side of the wall and alerts an operator by emitting light on the first side of the wall. In one embodiment, motion sensor module 100 does not comprise an accelerometer. In one embodiment, motion sensor module 100 does not comprise a power cord for connection to an external, non-battery, power source. In one embodiment, motion sensor module 100 does not comprise a stand or pedestal. In one embodiment, indicator 130 does not comprise a graphical user interface. In one embodiment, indicator 130 can include an infra-red emitter that is visible to an operator who is observing motion sensor module 100 with a night-vision and/or infra-red vision unit. In one embodiment, motion sensor module 100 is not a standoff unit and is configured to operate while it is attached to a wall. In one embodiment, indicator 130 can comprise a plurality of indicators which can optionally include one or more visible indicators and one or more infrared indicators.

Note that in the specification and claims, "about" or "approximately" means within twenty percent (20%) of the numerical amount cited.

One or more processors and/or microcontrollers can be provided and can operate via instructions of the computer code and the software is preferably stored on one or more tangible non-transitive memory-storage devices.

Although the invention has been described in detail with particular reference to these embodiments, other embodiments can achieve the same results. Variations and modifications of the present invention will be obvious to those skilled in the art and it is intended to cover all such modifications and equivalents. The entire disclosures of all patents and publications cited above are hereby incorporated by reference.

Although various dimensions of embodiments of the present invention are described and illustrated, the use of such dimensions is merely intended to provide the reader with the most preferred embodiment of the invention. To be clear, such dimensions are not essential to the operation of the invention and one or more, or even all, of the dimensions can be changed and will provide desirable results.

What is claimed is:

1. A motion sensor apparatus comprising:
an enclosure, said enclosure comprising a top and a bottom;
an adhesive disposed on said bottom of said enclosure, said adhesive configured to stick fast to a surface through which motion is to be detected such that a user need not continue to hold said motion sensor apparatus against the surface when in use;
a through-the-wall motion sensor disposed within said enclosure;
an indicator coupled to said enclosure and configured to indicate motion detected by the through-the-wall motion sensor; and
said through-the-wall motion sensor positioned to detect out of said bottom of said enclosure.

2. The motion sensor apparatus of claim 1 further comprising electromagnetic shielding material.

3. The motion sensor apparatus of claim 1 wherein said through-the-wall motion sensor comprises a continuous wave radar sensor.

4. The motion sensor apparatus of claim 1 wherein said through-the-wall motion sensor comprises an ultra-wide band radar sensor.

5. The motion sensor apparatus of claim 1 wherein said through-the-wall motion sensor is configured to distinguish between motion of a subject moving toward said through-the-wall motion sensor and motion of the subject moving away from said through-the-wall motion sensor.

6. The motion sensor apparatus of claim 1 wherein said through-the-wall motion sensor is configured to sense a distance to a subject from said through-the-wall motion sensor.

7. The motion sensor apparatus of claim 1 further comprising a passive infrared motion sensor.

8. The motion sensor apparatus of claim 1 further comprising a microcontroller.

9. The motion sensor apparatus of claim 8 wherein said microcontroller is configured to adjust a sensitivity of sensing distance of said through-the-wall motion sensor.

10. The motion sensor apparatus of claim 9 wherein said microcontroller is configured to adjust an intensity of said indicator.

11. The motion sensor apparatus of claim 9 further comprising a light detector, wherein said microcontroller is configured to adjust the intensity of said indicator based on an output of said light detector.

12. The motion sensor apparatus of claim 1 wherein said indicator comprises a light source.

13. The motion sensor apparatus of claim 1 wherein said indicator is configured to provide a first indicia to indicate the detection of motion of the subject moving toward said motion sensor apparatus and a second indicia to indicate the detection of motion of the subject moving away from said motion sensor apparatus.

14. The motion sensor apparatus of claim 1 wherein said motion sensor apparatus does not communicate data wirelessly to a remote display device in a manner which requires a user to look away from said motion sensor apparatus.

15. A motion sensor apparatus comprising:
an enclosure comprising a top, a bottom, an inside and an outside;
an adhesive disposed on said bottom of said enclosure, said adhesive configured to stick fast to a surface through which motion is to be detected such that a user need not continue to hold said motion sensor apparatus against the surface when in use;
a through-the-wall motion sensor disposed at least partially inside said enclosure, said through-the-wall motion sensor directed out through and away from said bottom of said enclosure; and
an indicator configured to indicate motion of a subject detected by said through-the-wall motion sensor.

16. The motion sensor apparatus of claim 15 wherein said indicator comprises a light source.

17. The motion sensor apparatus of claim 15 wherein said motion sensor apparatus is configured to be powered by a battery.

18. The motion sensor apparatus of claim 15 wherein said indicator is configured to provide a first indicia to indicate when said through-the-wall motion sensor detects a subject approaching and a second indicia to indicate when said through-the-wall motion sensor detects the subject moving away from said motion sensor apparatus.

19. A method for an operator on a first side of a wall to detect movement of a subject on an opposite side of the wall comprising:

attaching a through-the-wall motion sensor module to the first side of the wall by pressing a bottom of the through-the-wall motion sensor module against the first side of the wall such that an adhesive of the through-the-wall motion sensor adheres to the first side of the wall, the adhesive configured to stick fast to a surface through which motion is to be detected such that a user need not continue to hold the motion sensor module against the surface when in use;

activating the through-the-wall motion sensor module; and observing indicia of movement provided by an indicator of the through-the-wall motion sensor module.

20. The method of claim 19 wherein attaching a through-the-wall motion sensor comprises attaching with an adhesive that is a pressure-sensitive adhesive.

* * * * *